United States Patent [19]
Heino

[11] 4,017,003
[45] Apr. 12, 1977

[54] ARTICLE DISPENSING MACHINE
[75] Inventor: Richard N. Heino, Ashby, Mass.
[73] Assignee: The Lakso Company, Incorporated, Fitchburg, Mass.
[22] Filed: Dec. 18, 1975
[21] Appl. No.: 642,158
[52] U.S. Cl. ............................. 221/81; 221/233; 221/273; 222/221
[51] Int. Cl.² ........................................ B65G 47/34
[58] Field of Search .......... 222/216, 221; 221/233, 221/81, 273, 234

[56] References Cited
UNITED STATES PATENTS

| | | | |
|---|---|---|---|
| 2,343,496 | 3/1944 | Carroll | 221/233 X |
| 2,547,516 | 4/1951 | Zeun | 222/221 X |
| 2,661,133 | 12/1953 | Clement | 222/216 |
| 2,680,545 | 6/1954 | Malhoit | 221/233 |
| 2,888,963 | 6/1959 | Guyer | 222/221 X |

Primary Examiner—Robert B. Reeves
Assistant Examiner—Frederick R. Handren
Attorney, Agent, or Firm—W. R. Hulbert

[57] ABSTRACT

An article dispensing machine, of the type which has a conveyor including holders provided with a multiplicity of open-ended cavities for receiving the articles to be dispensed and for dispensing them by gravity discharge on tilting of the holders, is provided with ejectors for forcibly discharging any stuck articles which do not discharge by gravity. The ejectors are operative on the holders while tilted and are inserted through cooperating openings provided into the cavities to eject such stuck articles.

3 Claims, 6 Drawing Figures

ARTICLE DISPENSING MACHINE

BACKGROUND OF THE INVENTION

1. Field of the Invention

This invention relates to article dispensing machines, particularly such machines in which discrete articles are dispensed by gravity discharge from cavities in a holder, such as used in filling containers with regular numbers of such articles.

2. Description of the Prior Art

In despensing machines of the general type concerned, the articles are fed into open-ended cavities in a holder and the holder is moved to a discharge station where the holder is tilted for discharge of the articles from the cavities. In one type of container filling machine in which the invention is utilized to advantage, the holder has a plurality of elongated slats provided with the cavities which are conveyed in a succession transversely of their length from the filling station to the discharging station, where the holders are tilted for discharge of their contents to a succession of containers moved past the station. Such container filling machines are shown, for example, in U.S. Pat. No. 3,354,607 and U.S. patent application Ser. No. 462,107 now patent No. 3,925,960 of George W. Saari and Ronald L. Belliveau, filed Apr. 18, 1974 and assigned to the assignee of the present application.

With machines of the foregoing general type, difficulty has been experienced with occasional articles being stuck in the cavity so that they do not discharge under gravity at the discharge station, usually because they are either oversize or become wedged into the cavity by dust particles or pieces or chips broken off the articles. This difficulty is particularly troublesome where complete discharge is requisite for accurate count as in the container filling machines mentioned above, since an error in the count is thereby produced which may continue through many cycles before the condition is detected.

SUMMARY OF THE INVENTION

An object on this invention is to overcome the foregoing difficulty by providing means for mechanically automatically ejecting from the cavities articles stuck therein.

Another object is to provide such means which effects such ejection of such articles in synchronism with gravity discharge of associated articles, so that no inaccuracy of count occurs.

A further object is to provide such means which is arranged to avoid unnecessary contact with articles that freely discharge by gravity.

In attaining the foregoing objects, the cavity defining walls of the holder have an apertured portion providing access therethrough to the interior of each cavity at each article holding location therein. The ejector means is arranged to operate on the holder while tilted and has ejectors which are inserted through the apertured wall portion of the cavities at each article location in each cavity into the position occupied by an article therein before gravity discharge, so that any article stuck in a cavity will be engaged and projected out the cavity open end. Preferably, the ejector means is located to effect this action during initial tilting of the holders while gravity discharge of the cavities is taking place. Preferably, also, the insertion of the injectors is coordinated with the tilting so that the injectors enter each space occupied by an article before tilting after, preferably immediately after, the article has vacated that space by gravity due to tilting if it is not stuck, thereby avoiding unnecessary contact of the ejectors with the articles.

DESCRIPTION OF THE PREFERRED EMBODIMENTS

Figure 1:
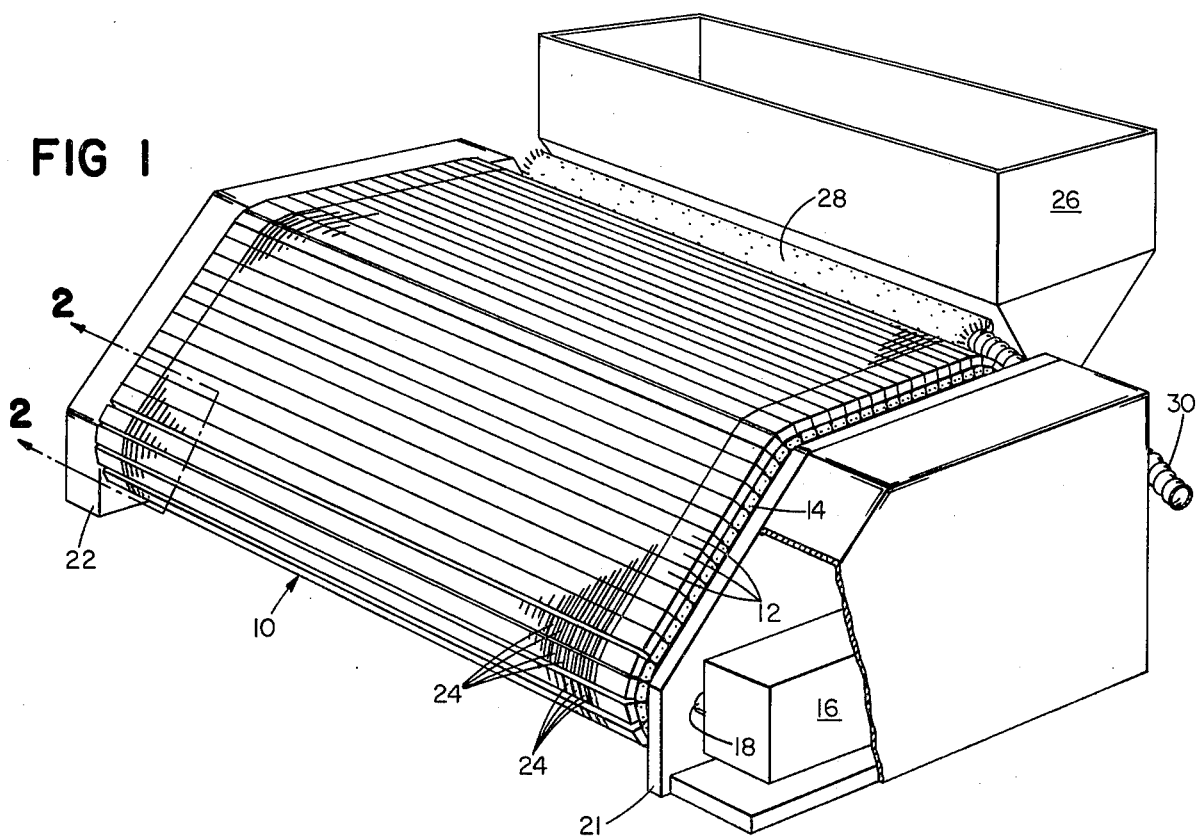
FIG. 1 is a partially broken away perspective view of dispensing apparatus embodying the present invention, with slat cavities only partially shown.

Except for incorporation of ejector mechanisms according to this invention, the dispensing apparatus shown in FIG. 1 is like that of application Ser. No. 462,107 above referred to. It has a conveyor designed generally 10 which is made up of elongated slats 12 mounted with their long sides contiguous on the links of end chains 14 (one shown in FIG. 1). Chains 14 are mounted on sprockets (not shown in FIG. 1) so that the conveyor moves in a direction transverse of the slats from the righthand end in FIG. 1, which is the back of the apparatus, to the lefthand front of the apparatus, over the top and returning underneath and up in an endless path. A motor 16 has a drive shaft 18 connected to drive the sprockets 20 at the lefthand end of the apparatus in FIG. 1 (one shown in FIG. 2), shaft 18 extending rotatably through end frames 21 and 22 of the apparatus.

Some or all of the slats are provided with a longitudinal row of adjacent open ended cavities 24 each adapted to receive one article to be dispensed, the rows extending the full length of the slats except for short blank end portions. In FIG. 1 it is contemplated that all slats are provided with such cavities although they are only partially indicated, and that the articles which they are adapted to receive and dispense are flat tablets of circular outline, it being understood that slats with cavities adapted to other articles of various sizes and shapes, or intermittent slats without cavities, may be substituted. The articles are supplied to the slat cavities by a vibratory hopper 26 at the back of the apparatus as the conveyor moves upwardly in an inclined path between lower and upper sprockets (not shown).

Figure 6:
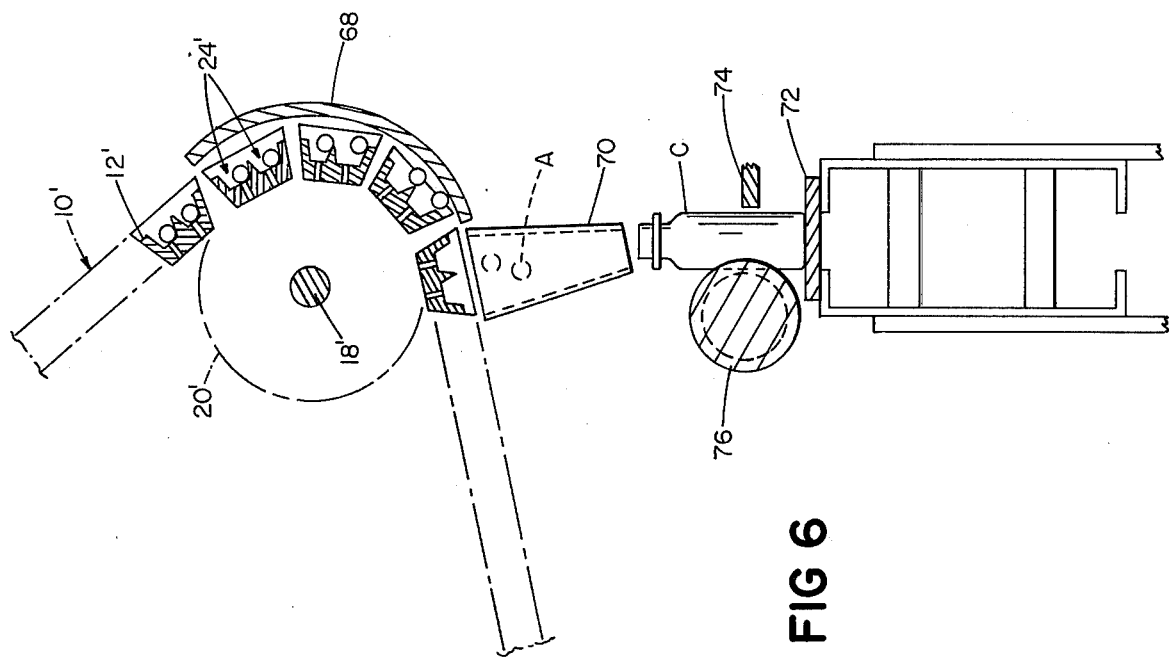
FIG. 6 is a view similar to FIG. 5 of the apparatus modified according to FIG. 4 utilized in connection with another container filling apparatus and with the ejector means differently located than in FIG. 1.
Figure 5:
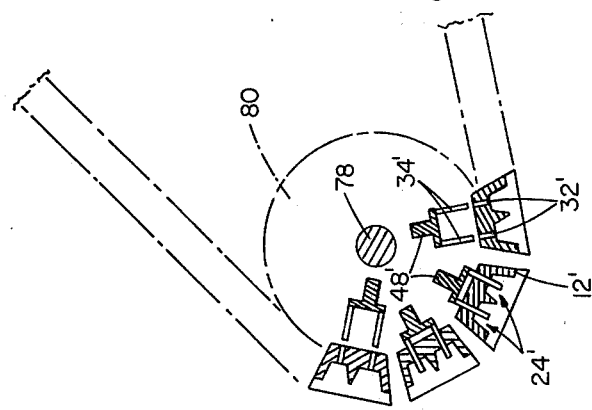
FIG. 5 is a largely diagrammatic, partial side and cross-section view of dispensing apparatus according to FIG. 1 utilized with one type of container filling apparatus.
Figure 5:
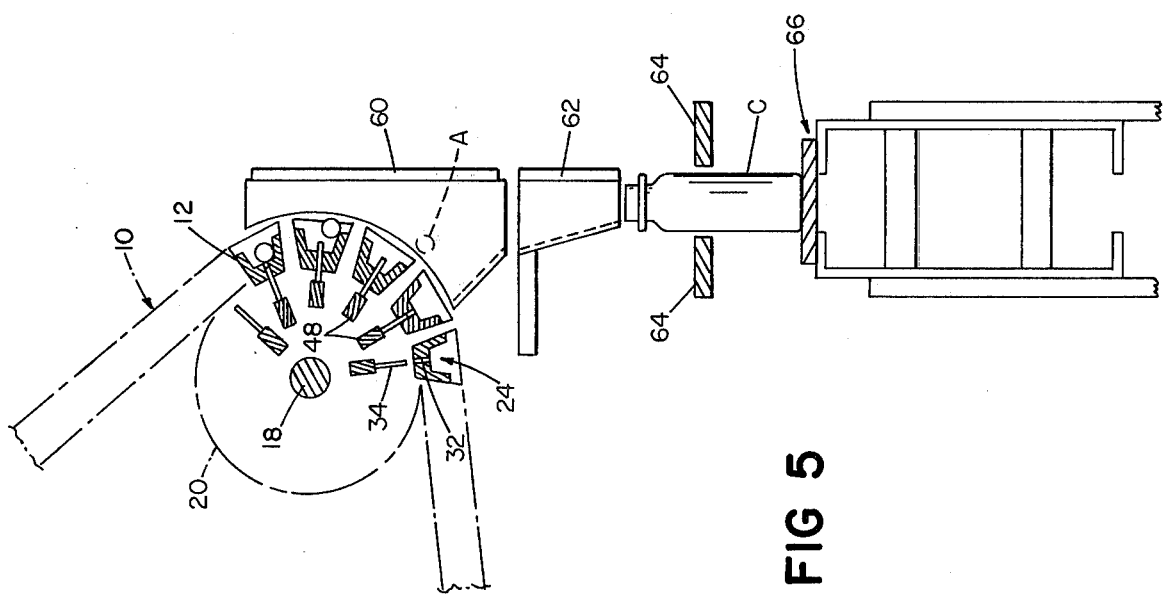

A rotary brush 28 downstream from hopper 26, having a tube 30 for connection to a suction system (not shown) for dust removal, removes excess articles that are not accommodated in the cavities. At the front end the slats are tilted so that the articles are dispensed from the open ends of cavities 24 by gravity. Suitable receiving equipment, not shown in FIG. 1, will be provided at the dispense area, several forms of which are shown in FIGS. 5 and 6 and in the patent and patent application above referred to. As the conveyor moves from the brush 28 to the dispense position, the cavities may be inspected for undesired vacancies, either visually or by automatic means such as disclosed in the aforesaid patent, so that steps may be taken to correct the error in count that would otherwise occur.

Figure 4:
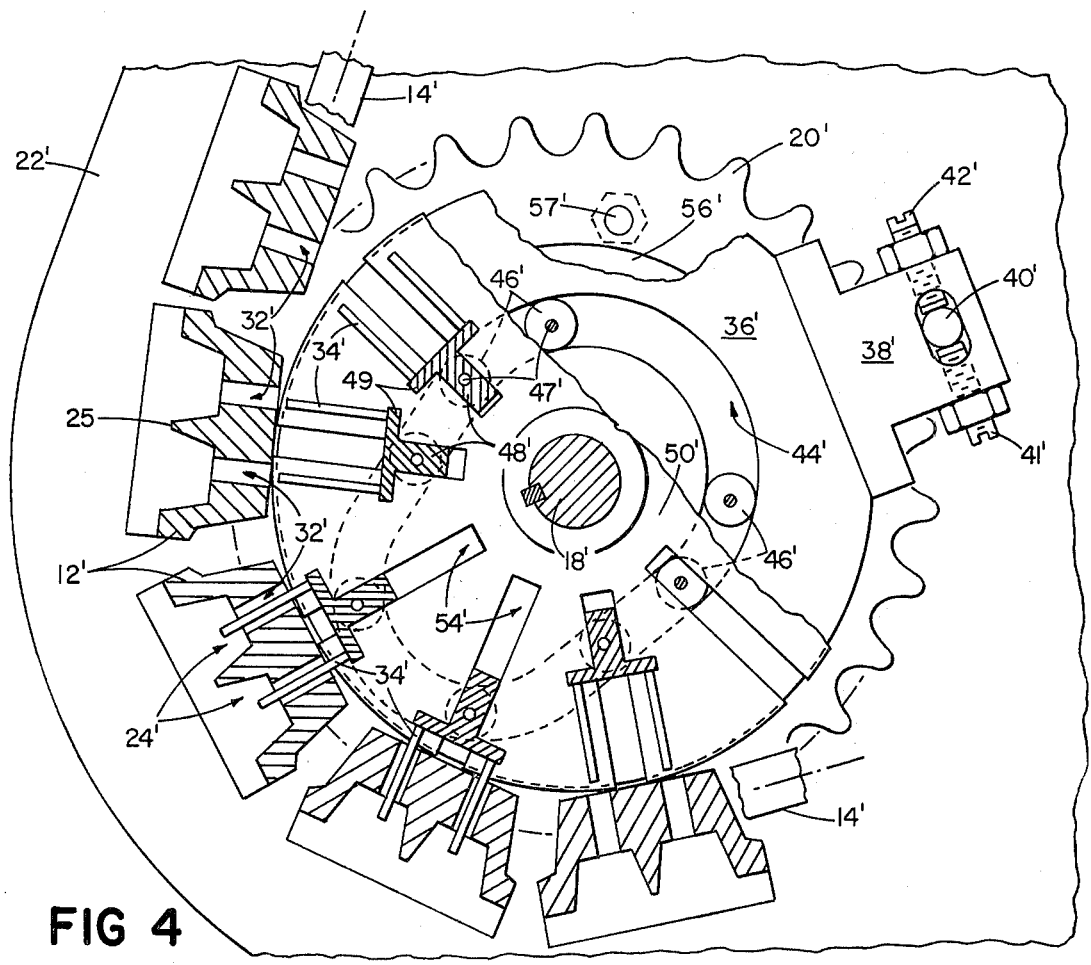
FIG. 4 is a fragmentary transverse section view similar to FIG. 2 showing a modification.

In accordance with the invention, the apparatus is provided with means for ejecting from the slat cavities, while the slats are tilted, any articles which may have become wedged in their cavities. Preferably where feasible, and as shown in FIGS. 2-4 now to be described, such means are located to act on the slat cavities while the chains 14 are passing over sprockets 20 and the slats are being tilted for gravity discharge of the articles A.

Figure 2:
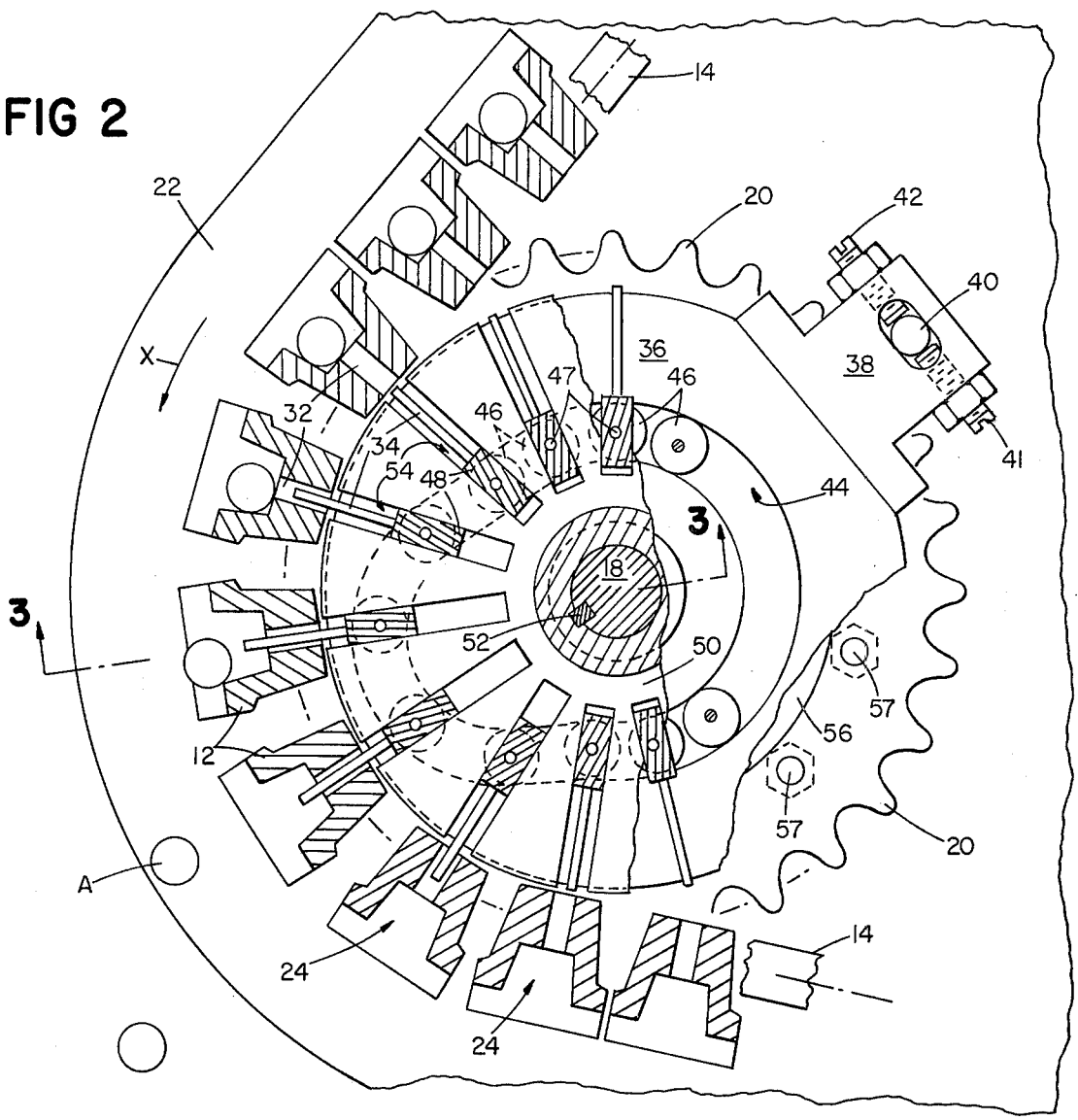
FIG. 2 is an enlarged transverse section view on line 2—2 of FIG. 1, looking in the direction of the arrows.

Referring to FIG. 2, each article holding cavity 24 of each slat 12 is provided with an opening 32 extending centrally through its end opposite its open end and through the opposite face of the slat. As chains 14 pass downwardly over the sprockets 20, ejector pins 34 of smaller diameter than openings 32 are projected through these openings into the interior of the cavity sufficiently to force out any article A that is wedged in a cavity so that it does not respond to gravity discharge, and are then withdrawn from the apertures, by a cam arrangement now to be described.

Figure 3:
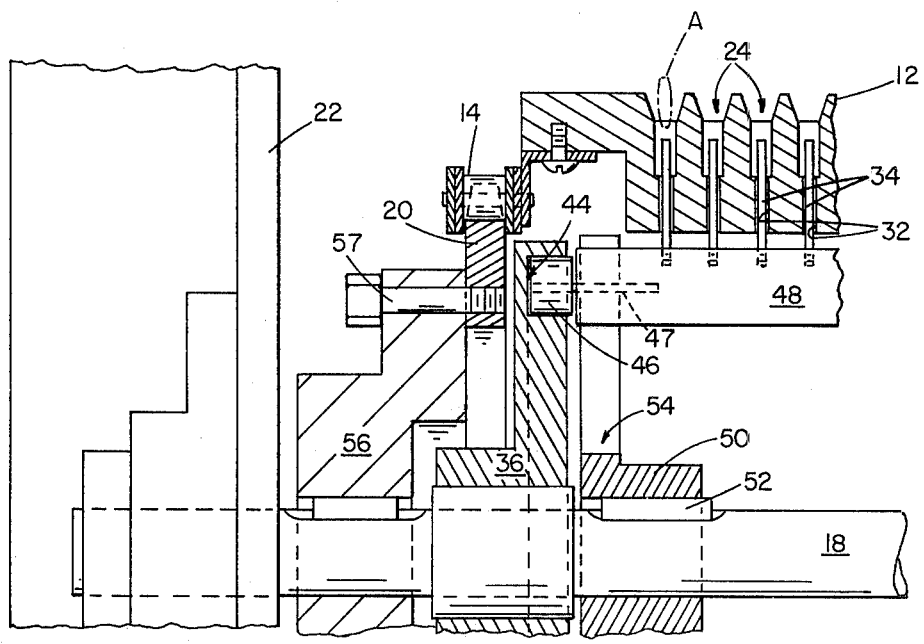
FIG. 3 is a longitudinal section view on line 3—3 of FIG. 2.

Continuing to refer to FIG. 2 and also to FIG. 3, it should be understood that the structure there shown at one end of the discharge portion of the apparatus is duplicated at the opposite end, except that drive shaft 18, the end of which is journaled in a bearing on frame member 22 in FIG. 3, is connected to motor 16 at its opposite end. This structure comprises a disc 36 loosely surrounding shaft 18 and fixed to the adjacent frame member 22 by a clamp member 38, adjustably fixed about the axis of a rod 40 secured to frame 22, by bolts 41, 42 engaging opposite sides of the rod. Disc 36 is provided with a cam track 44 in which ride rollers 46 rotatably mounted on shafts 47 at the adjacent ends of ejector pin bars 48 which extend across the machine parallel to slats 12. A spider wheel 50 is fixed to shaft 18 by key 52 so that the spider wheel is adjacent the inside face of cam disc 36. Wheel 50 is provided with slots 54, having their center lines radial to the axis of shaft 18, in which the adjacent ends of bars 48 are longitudinally slidable. A drive wheel 56 keyed to shaft 18 is fastened by bolts 57 to sprocket 20 (FIG. 3).

Each bar 48 is provided with a row of ejectors in the form of the pins 34 projecting therefrom parallel to the sides of the slot 54 in which the bar slides. Pins 34 correspond in number and spacing to the number and spacing of the openings 32 into the cavities 24 of the slats. As shaft 18 rotates (counterclockwise, in the direction of arrow X), slats 12 pass radially about the shaft for an arc of the order of 90°. Cam track 44 acts on rollers 46 to guide bars 48 through this arc, as propelled by spider wheel 50, with their pins 34 in radial alignment with openings 32 of one of the slats 12, and so that the bars approach close to the periphery of disc 36 while the bars are moved through this arc.

In consequence, the pins 34 are projected progressively through openings 32, entering cavities 24 as bars 12 reach a position in which gravity will cause the tablets A to roll out of the cavities 24 if they are free to do so. The ejector pins 34 therefore enter cavities 24 as they are vacated by those tablets A which discharge by gravity. However, if a tablet A is stuck in its slot, it will be engaged by the corresponding ejector pin 34 and ejected in time to join those ejected by gravity, so that no error in count occurs. As the movement continues, cam track 44 guides rollers 46 and bars 48 away from the periphery of disc 36, so that pins 34 are progressively withdrawn from openings 32, being removed therefrom by the time the slats 12 move out of radial relation to shaft 18.

FIG. 4 shows a modification of the apparatus of FIGS. 1-3 to adapt it to slats each having two rows of article-holding cavities, primes of the same reference numerals being used to designate parts that are the same or correspond to those of FIGS. 1-3. In FIG. 4 each slat 12' is provided with two longitudinal rows of cavities 24', separated by an intervening wall 25. For dispensing the same articles, each cavity 24' may be the same as cavities 24 of FIGS. 1-3 and each cavity is provided with a like opening 32'. Bars 48' are modified to the extent that they have a wider plate 49 secured to their outer long side on which are mounted two rows of the ejector pins 34', the axes of corresponding pins in the two rows being spaced apart the same distance as the axes of corresponding openings 32' of the two rows of cavities 24' of a slat.

Disc 36' is fixed to frame 22' in the same manner as in FIG. 2, and has a like cam track 44' which receives rollers 46' on the adjacent end of bars 48'. Spider wheel 50' is the same as wheel 50 of FIG. 2, except that it has fewer of the corresponding slots 54'. These slots are spaced so that as each double cavity row slat 24' moves into position radial to shaft 18', a slot 54' and bar 48' will be centered below the center of dividing wall 25, and the two rows of pins 34' on the bar will be coaxially disposed below the corresponding openings 32'. As movement proceeds, the pins are projected through the openings into the cavities and then withdrawn by the action of cam track 44' on rollers 46', in the same manner as with the single cavity row slats and single pin rows of FIG. 2, and with like effect.

FIG. 5 shows diagrammatically apparatus according to FIGS. 1-3 in combination with apparatus for enabling the filling thereby of containers C with a predetermined count of articles A, again shown as tablets. The cavities 24 discharge the tablets, as the slats move downwardly about the axis of shaft 18, into receiving chutes 60 extending longitudinally of the slats, so that each chute receives simultaneously the discharge from a predetermined number of cavities of each slat. Each chute 60 in turn discharges to a second chute 62 having an inlet sized to conform to the tapered outlet from a chute 60 and a tapered outlet sized to discharge into a container C located below it. The containers are moved into position below hoppers 62 between guides 64 by a conveyor 66.

The chutes 62 may by stationary and the containers C moved in batches intermittently into receiving position below chutes 62. In such case the dispensing mechanism may be stopped during each indexing period while filled containers are moved out of fill position and replaced by empty ones. However, according to a common practice, the dispensing apparatus is operated continuously and automatic gates (not shown) are provided for retaining the articles discharged into chutes 60 during the indexing period.

Alternatively, chutes 62 may be mounted for movement in a closed path during part of which they are located in the position shown in FIG. 5, for example as disclosed in the aforesaid patent application. In such case the containers may be moved, and the dispensing mechanism operated, continuously, with blind slats (i.e., without cavities) interspersed with cavitied slats, again as disclosed in the aforesaid patent application. Such blind slats may conveniently be provided with blind openings (closed at the slat face) like openings 32 but deep enough to receive the full injected length of pins 34, thus enabling substitution of blind slats without changing the ejector mechanism.

FIG. 6 shows diagrammatically ejector means according to the modification of FIG. 4 at a different location in the dispensing apparatus of FIG. 1 used in combination with another type of apparatus for filling containers with the dispensed articles. In this type, gravity discharge of the articles A from cavities 24' of slats 12' as they pass downwardly about the axis of shaft 18' is prevented by a shield member 68 extending about that axis in proximity to the open ends of cavities 24', until the slats have become substantially fully inverted and are moving out of radial relation to shaft 18'. This enables discharge from the slat cavities into one set of chutes 70 which in turn discharge directly into containers C moved along a slide 72 and a guide 74 by a rotating conveyor worm 76. This arrangement provides a shorter fall for the articles, as is desirable where they are fragile. A shield arrangement such as 68 is used also in the apparatus of U.S. Pat. No. 3,354,607 mentioned above, wherein the articles are discharged from the slat cavities after the slats have been inverted as in FIG. 6, but in a different container filling arrangement from that shown in FIG. 6, in which the slats are discharged while they are moved endwise.

In such arrangements, it may not be practical to locate the ejector means of FIGS. 1 to 4 at shaft 18 or 18' so that the ejector mechanism is operative as the articles A are being gravity discharged. In such cases, the ejector means may be located for operation in conjunction with another shaft and sprocket, such as the shaft 78 and sprocket 80 in FIG. 6, located at the rear of the machine of FIG. 1, about which the slats pass to tilt them from inverted to an upwardly inclined position. Except for the change in location, the ejector means may be the same as in FIGS. 2 and 3 or 4, so that the pins 34' will eject any articles that failed to discharge at the preceding dispensing station. While this location is not as desirable as that of the previous Figures since it does not prevent a single error in count occurring for each stuck article, it is nevertheless advantageous in avoiding any further errors due to that stuck article.

I claim:

1. In an article dispensing machine which has conveyor means including holder means providing a multiplicity of cavities having an open end for receiving therein the articles to be dispensed, feed means for feeding articles to be dispensed into said cavities, tilt means for tilting said holder means to a position in which articles in the cavities thereof may discharge by gravity, and means for moving said conveyor in an endless path between said feed means and said tilt means, the improvement comprising the combination of, cavity defining wall means in said holder means having an apertured portion providing access therethrough to the interior of each cavity at each article holding location therein, and ejector means operative on said holder means while tilted, and having ejectors inserted through said apertured portion of said wall means at each said location in each said cavity into the positions occupied by the articles before discharge to engage and dislodge articles retained therein, said holder means comprising a plurality of elongated slats connected for movement by said conveyor means in a direction transverse to their length and having said cavities formed therein, said tilt means including means for causing said slats to move partially about an axis, and said ejectors being arranged for eccentric travel about said axis.

2. A machine according to claim 1 wherein said apertured portion comprises individual apertures at said locations extending through the face of the slats opposite the open ends of said cavities, and said ejectors comprise pins inserted through said apertures and withdrawn therefrom by the eccentric travel of said ejectors.

3. A machine according to claim 2 wherein said ejector means includes means providing a fixed cam track extending about said axis, a plurality of bars having said pins mounted thereon and provided with rotatable end rollers received in said track, and a spider wheel rotatable about said axis and having radially disposed slots in which said bars are longitudinally slidable.

* * * * *

Disclaimer 4,017,003.—*Richard N. Heino*, Ashby, Mass. ARTICLE DISPENSING MACHINE. Patent dated Apr. 12, 1977. Disclaimer filed Aug. 23, 1985, by the assignee, *Package Machinery Co., Inc.*

Hereby enters this disclaimer to claims 1-3 of said patent.
[*Official Gazette November 19, 1985.*]